United States Patent
Fructuoso et al.

(10) Patent No.: US 9,263,028 B2
(45) Date of Patent: *Feb. 16, 2016

(54) METHODS AND SYSTEMS FOR AUTOMATED GENERATION OF NATIVIZED MULTI-LINGUAL LEXICONS

(71) Applicant: Google Inc., Mountain View, CA (US)

(72) Inventors: Javier Gonzalvo Fructuoso, London (GB); Ioannis Agiomyrgiannakis, London (GB)

(73) Assignee: Google Inc., Mountain View, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/283,586

(22) Filed: May 21, 2014

(65) Prior Publication Data

US 2015/0095018 A1 Apr. 2, 2015

Related U.S. Application Data

(63) Continuation of application No. 14/053,052, filed on Oct. 14, 2013, now Pat. No. 8,768,704.

(60) Provisional application No. 61/884,510, filed on Sep. 30, 2013.

(51) Int. Cl.

| | |
|---|---|
| *G10L 13/00* | (2006.01) |
| *G10L 13/08* | (2013.01) |
| *G10L 15/06* | (2013.01) |
| *G06F 17/27* | (2006.01) |
| *G10L 15/187* | (2013.01) |

(52) U.S. Cl.
CPC ............ *G10L 13/086* (2013.01); *G06F 17/277* (2013.01); *G10L 13/08* (2013.01); *G10L 15/063* (2013.01); *G10L 15/187* (2013.01); *G10L 2015/0633* (2013.01)

(58) Field of Classification Search
CPC ............................. G10L 13/08; G10L 13/086

USPC ............ 704/2, 8, 9, 231, 254, 258, 260, 263, 704/270, 277

See application file for complete search history.

(56) References Cited

U.S. PATENT DOCUMENTS

| | | | |
|---|---|---|---|
| 7,149,688 | B2 | 12/2006 | Schalkwyk |
| 7,761,297 | B2 | 7/2010 | Lee |
| 8,260,615 | B1 | 9/2012 | Nakajima et al. |
| 2013/0211815 | A1 | 8/2013 | Seligman et al. |

FOREIGN PATENT DOCUMENTS

EP 11418570 3/2007

OTHER PUBLICATIONS

Do et al., "Context Dependent Phone Mapping for Cross-Lingual Acoustic Modeling", IEEE International Symposium on Chinese Spoken Language Processing, (ISCLP), 2012, p. 16-20.

Sim, "Discriminative Product-of-Expert Acoustic Mapping from Cross-Lingual Phone Recognition", in IEEE Workshop on Automatic Speech Recognition and Understanding (ASRU), 2009, p. 541-546.

*Primary Examiner* — Shaun Roberts

(74) *Attorney, Agent, or Firm* — McDonnell Boehnen Hulbert & Berghoff LLP

(57) ABSTRACT

An input signal that includes linguistic content in a first language may be received by a computing device. The linguistic content may include text or speech. The computing device may associate the linguistic content in the first language with one or more phonemes from a second language. The computing device may also determine a phonemic representation of the linguistic content in the first language based on use of the one or more phonemes from the second language. The phonemic representation may be indicative of a pronunciation of the linguistic content in the first language according to speech sounds of the second language.

20 Claims, 10 Drawing Sheets

METHODS AND SYSTEMS FOR AUTOMATED GENERATION OF NATIVIZED MULTI-LINGUAL LEXICONS

CROSS-REFERENCE TO RELATED APPLICATION

This patent application is a continuation of U.S. patent application Ser. No. 14/053,052 filed on Oct. 14, 2013, which claims priority to U.S. Provisional Patent Application No. 61/884,510 filed on Sep. 30, 2013, the entire contents of each of which are incorporated herein by reference.

BACKGROUND

Unless otherwise indicated herein, the materials described in this section are not prior art to the claims in this application and are not admitted to be prior art by inclusion in this section.

Speech processing systems such as text-to-speech (TTS) systems and automatic speech recognition (ASR) systems may be employed, respectively, to generate synthetic speech from text and generate text from audio utterances of speech.

A first example TTS system may concatenate one or more recorded speech units to generate synthetic speech. A second example TTS system may concatenate one or more statistical models of speech to generate synthetic speech. A third example TTS system may concatenate recorded speech units with statistical models of speech to generate synthetic speech. In this regard, the third example TTS system may be referred to as a hybrid TTS system.

Some ASR systems use "training" where an individual speaker reads sections of text into the speech recognition system. These systems analyze a specific voice of a person and use the voice to fine tune recognition of that speech for that person resulting in more accurate transcription. Systems that do not use training may be referred to as "Speaker Independent" systems. Systems that use training may be referred to as "Speaker Dependent" systems.

Such speech processing systems may operate in a single language such as a system language or native language. In one example, a TTS system may generate synthetic English language speech that corresponds to English language text input to the TTS system. In another example, an ASR system may map audio utterances of speech by an English language speaker to English language text.

SUMMARY

In one example, a method is provided that comprises receiving an input signal that includes linguistic content in a first language. The linguistic content may include text or speech. The method further comprises associating the linguistic content in the first language with one or more phonemes from a second language by a computing device that includes one or more processors. The method further comprises determining a phonemic representation of the linguistic content in the first language based on use by the computing device of the one or more phonemes from the second language. The phonemic representation may be indicative of a pronunciation of the linguistic content in the first language according to speech sounds of the second language.

In another example, a method is provided that comprises receiving configuration input that includes first linguistic content in a first language and second linguistic content in a second language. The first linguistic content may include a plurality of first-language speech sounds assigned to a plurality of first-language phonemes. The second linguistic content may include a plurality of second-language speech sounds assigned to a plurality of second-language phonemes. The method further comprises determining assignments between the plurality of first-language speech sounds and the plurality of second-language phonemes by a computing device. The method further comprises generating a lexicon that includes a plurality of entries based on the assignments. A given entry in the lexicon may include text in the first language matched with a phonemic representation that includes one or more of the plurality of second-language phonemes. The phonemic representation may be indicative of a pronunciation of the text in the first language according to speech sounds of the second language.

In yet another example, a computer readable medium is provided. The computer readable medium may have instructions stored therein that when executed by a computing device cause the computing device to perform functions. The functions comprise receiving an input signal that includes linguistic content in a first language. The linguistic content may include text or speech. The functions further comprise associating the linguistic content in the first language with one or more phonemes from a second language. The functions further comprise determining a phonemic representation of the linguistic content in the first language based on use of the one or more phonemes from the second language. The phonemic representation may be indicative of a pronunciation of the linguistic content in the first language according to speech sounds of the second language.

These as well as other aspects, advantages, and alternatives, will become apparent to those of ordinary skill in the art by reading the following detailed description, with reference where appropriate to the accompanying figures.

DETAILED DESCRIPTION

Figure 1A:
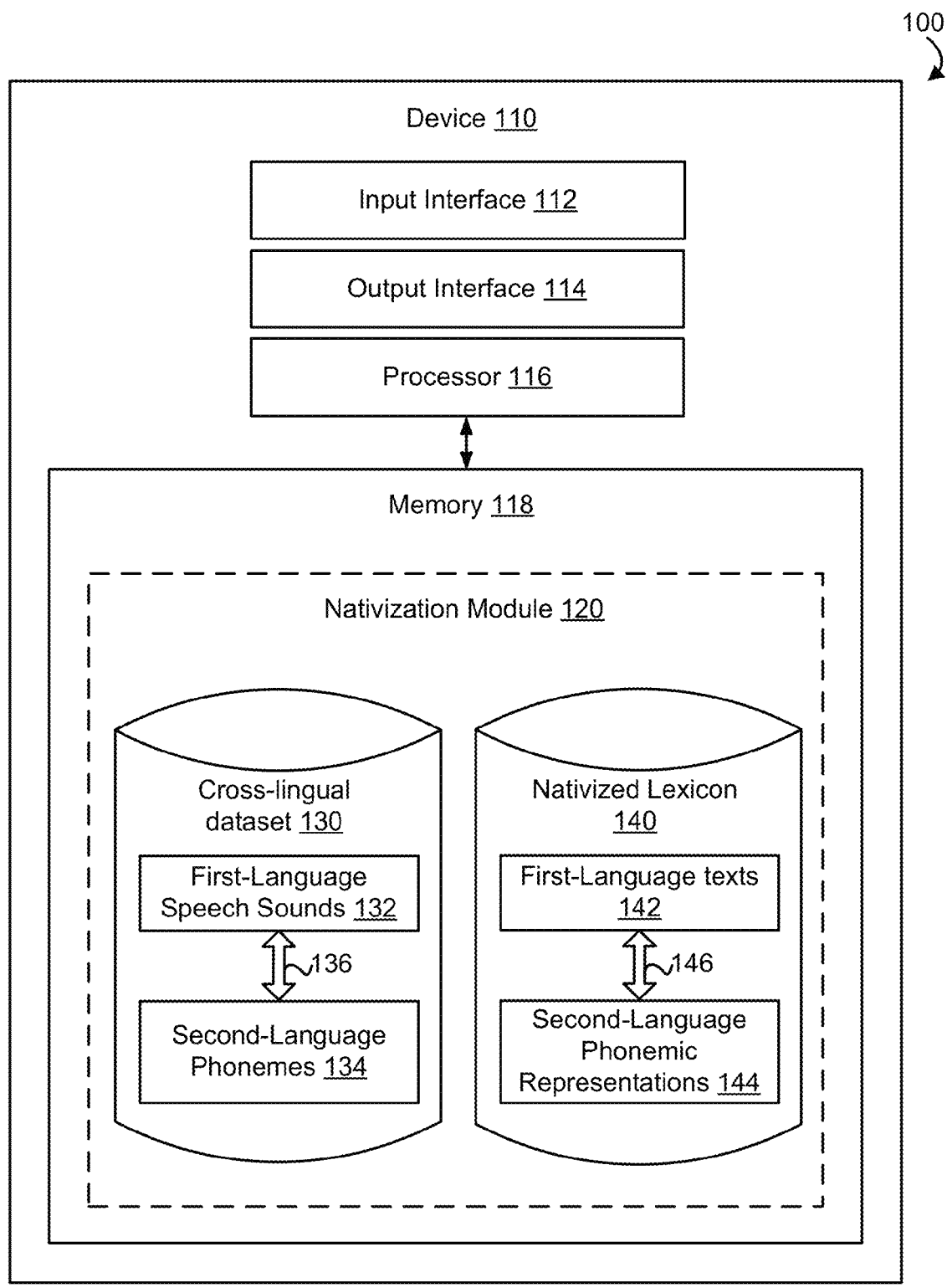
FIG. 1A illustrates an example speech processing system, in accordance with at least some embodiments described herein.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Speech processing systems such as text-to-speech (TTS) and automatic speech recognition (ASR) systems may be deployed in various environments to provide speech-based user interfaces. Some of these environments include residences, businesses, vehicles, etc.

In some examples, ASR may provide voice control over devices such as large appliances, (e.g., ovens, refrigerators, dishwashers, washers and dryers), small appliances (e.g., toasters, thermostats, coffee makers, microwave ovens), media devices (e.g., stereos, televisions, digital video recorders, digital video players), communication devices (e.g., cellular phones, personal digital assistants), as well as doors, curtains, navigation systems, and so on. In some examples, the devices described above may communicate to a user via TTS. For example, an ASR may receive audio utterances that correspond to an address for a navigation system, obtain text that includes directions to the address based on the audio utterances, and then a TTS may guide the user to the address by generating audio that corresponds to the text with the directions.

The speech received by the ASR and/or text received by the TTS may be described as linguistic content. Within some examples, the term "linguistic content" may refer to text or speech or a combination of speech and text, for example. The linguistic content may be represented by a phonemic representation (e.g., transcription). Within some examples, the term "phonemic representation" may refer to the linguistic content presented as one or more phonemes indicative of a pronunciation of the linguistic content, perhaps by representing the linguistic content as a sequence of one or more phonemes. The one or more phonemes may be determined using an algorithm, method, and/or process suitable for processing the linguistic content, in order to determine the phonemic representation.

In some examples, a phoneme may be considered to be a smallest segment (or a small segment) of an utterance that encompasses a meaningful contrast with other segments of utterances. Thus, a word typically includes one or more phonemes. For example, phonemes may be thought of as utterances of letters; however, some phonemes may present multiple letters. An example phonemic representation for the English language pronunciation of the word "cat" may be /k/ /ae/ /t/, including the phonemes /k/, /ae/, and /t/ from the English language. In another example, the phonemic representation for the word "dog" in the English language may be /d/ /aw/ /g/, including the phonemes /d/, /aw/, and /g/ from the English language. In yet another example, the phonemic representation for the word "hola" in the Spanish language may be /o/ /l/ /a/, including the phonemes /o/, /l/, and /a/ from the Spanish language.

Different phonemic alphabets exist, and these alphabets may have different textual representations for the various phonemes therein. For example, the letter "a" in the English language may be represented by the phoneme /ae/ for the sound in "cat," by the phoneme /ey/ for the sound in "ate," and by the phoneme /ah/ for the sound in "beta." Other phonemic representations are possible. As an example, in the English language, common phonemic alphabets contain about 40 distinct phonemes. As another example, in the Spanish language, common phonemic alphabets contain about 24 distinct phonemes.

In some examples, the phonemic representation determined by a speech processing system, such as those described above, may include one or more phonemes from a default system language of the speech processing system. In a first example, an English language ASR may determine one or more phonemes from the English language that correspond to the received audio of English Language speech. In this example, the English language is the system language. In a second example, a Spanish language TTS may determine one or more phonemes from the Spanish language that correspond to received Spanish language text. In this example, the Spanish language is the system language.

However, in some examples, the user of the speech processing system may use words that do not exist in the system language of the speech processing system. For example, a Spanish language speaker may provide English language text to a Spanish language TTS. In this example, the Spanish language TTS may be unable to recognize the English language text. For example, the Spanish language TTS may not find the English language text in a Spanish language lexicon accessible to the Spanish language TTS. Within examples, the term "lexicon" may indicate a dictionary that matches words in a given language with a phonemic representation of the word using phonemes from the given language. Further, in this example, if the Spanish language TTS attempts to determine the Spanish language phonemic representation using a module such as a Grapheme-To-Phoneme (G2P) module, the resulting phonemic representation may indicate a wrong meaning. For example, the word "palace" in English language may be pronounced as "palathe" by the G2P interpretation, because the letter "c" in the Spanish language may be pronounced like the letters "th" in the English language in the context of the English word "palace." Additionally, the English language phonemic representation for the word "palace" corresponds to the English language phonemes /p/ /ax/ /l/ /aa/ /s/. However, the Spanish language does not have the English language phonemes /ax/ and /aa/. Thus, for example, a Spanish speaker pronouncing the English word "palace" may actually pronounce the word "palace" in accordance with the Spanish language phonemic representation /p/ /a/ /l/ /a/ /s/. However, for example, the speech processing system may not be able to determine the Spanish language phonemic representation described above because the English word "palace" may not be found in the Spanish language lexicon.

Within examples herein, systems, methods and devices are provided to determine phonemic representation of linguistic content in a first language using phonemes from a second language. The determined phonemic representation may be indicative of a pronunciation of the first language linguistic content using second language speech sounds. For example, the determined phonemic representation may correspond to the pronunciation of the first language linguistic content by a second language speaker (e.g., English word spoken by a Spanish speaker).

Additionally, some examples provide an automated process for generating a nativized multi-lingual lexicon for use by a TTS and/or ASR system. The lexicon, for example, may be generated based on a speech sample in a first language, corresponding text in the first language, a speech sample in a second language, and corresponding text in the second language. The first-language speech and second-language speech in this example do not necessarily include similar content. For example, the first-language speech may include a recitation of a story in the first language, and the second-language speech may include a recitation of a newspaper article in the second language. Thus, the nativized lexicon may be automatically generated by the example system, without the need to manually update the second-language lexicon by adding a second-language phonemic representation for every first-language word.

Referring now to the figures, FIG. 1A illustrates an example speech processing system 100, in accordance with at least some embodiments described herein. The system 100 includes a device 110 that includes an input interface 112, an output interface 114, a processor 116, and a memory 118.

The device 110 may comprise a computing device such as a smart phone, digital assistant, digital electronic device, body-mounted computing device, personal computer, or any other computing device configured to execute instructions included in the memory 118 to operate the device 110. Although not illustrated in FIG. 1A, the device 110 may include additional components, such as a camera, an antenna, or any other physical component configured, based on instructions in the memory 118 executable by the processor 116, to operate the device 110. The processor 116 included in the device 110 may comprise one or more processors configured to execute instructions in the memory 118 to operate the device 110.

The input interface 112 may include an audio input device, such as a microphone, audio auxiliary input, or any other component configured to receive an audio signal and transmit the audio signal for processing by processor 116. Additionally or alternatively, input interface 112 may include a text input device such as a keyboard, touch-screen display, or any other component configured to provide an input signal comprising text content to the processor 116.

The output interface 114 may include an audio output device, such as a speaker, headphone, or any other component configured to receive an output audio signal from the processor 116, and output sounds that may indicate speech content based on the audio signal. Additionally or alternatively, the output interface may include a text output device, such as a display panel, Liquid Crystal Display (LCD), Light Emitting Diodes (LED) display, cathode ray tube (CRT), display using digital light processing (DLP) technology, printer, or any other component configured to receive an output signal from the processor 116, and output text based on the output signal.

Alternatively, the input interface 112 and the output interface 114 may include network interface components configured to, respectively, receive and/or transmit the input signal and/or the output signal described above. For example, an external computing device may provide the input signal to the input interface 112 via a communication medium such as Wifi, WiMAX, Ethernet, Universal Serial Bus (USB), or any other wired or wireless medium. Similarly, for example, the external computing device may receive the output signal from the output interface 114 via the communication medium described above.

The memory 118 may include one or more memories (e.g., flash memory, Random Access Memory (RAM), solid state drive, disk drive, etc.) that include software components configured to provide instructions executable by the processor 116 pertaining to the operation of the device 110. Although illustrated in FIG. 1A that the memory 118 is physically included in the device 110, in some examples, the memory 118 or some components included thereon may be physically stored on a remote computing device. For example, some of the software components in the memory 118 may be stored on a remote server accessible by the device 110.

The memory 118 may include a nativization module 120 configured to provide instructions executable by the processor 116 to cause the device 110 to associate linguistic content (e.g., text, speech) in a first language with one or more phonemes in a second language. The nativization module 120 may comprise, for example, a software component such as an application programming interface (API), dynamically-linked library (DLL), or any other software component configured to provide the instructions described above to the processor 116. Further, in some examples, the nativization module 120 may be configured to determine a phonemic representation (e.g., transcription) of the linguistic content in the first language based on use of one or more phonemes from the second language. Thus, in these examples, the phonemic representation may be indicative of a pronunciation of the linguistic content in the first language based on the one or more phonemes from the second language (e.g., first-language pronunciation with a second-language accent).

To facilitate the association described above, in some examples, the nativization module 120 may include a cross-lingual dataset 130. The cross-lingual dataset 130 may include, for example, one or more databases stored in the memory 118 that include information to facilitate associating the first-language linguistic content with the second-language phonemes. The cross-lingual dataset 130 may include a plurality of first-language speech sounds 132. In some examples, the first-language speech sounds 132 may comprise recorded speech units or representations thereof that indicate an audio utterance of a portion of speech in the first language. For example, where the first language is the English language, a given first-language speech sound of the first-language speech sounds 132 may be an audio file indicative of a pronunciation of the letter "a" in the English word "cat" (e.g., the utterance that corresponds to the English language phoneme /ae/).

The cross-lingual dataset 130 may also include a plurality of second-language phonemes 134. In some examples, the second-language phonemes 134 may describe an utterance of a portion of speech in the second language. For example, where the second language is Spanish language, the word "jamón" in Spanish language corresponds to the Spanish language phonemic representation /x/ /a/ /m/ /o/ /n/. Thus, for example, the phoneme /x/ in the Spanish word "jamón" may be one of the second-language phonemes 134 in the cross-lingual dataset 130.

A given first-language speech sound of the first-language speech sounds 132 and a given second-language phoneme of the plurality of second-language phonemes 134 are matched by cross-lingual assignments 136. For example, the English language utterance (e.g., the given first-language speech sound) of the letter "a" in the English word "cat" may be assigned to the Spanish language phoneme /a/ (e.g., the given second-language phoneme) by the cross-lingual assignments 136.

Additionally or alternatively to the cross-lingual dataset 130, in some examples, the nativization module 120 may include a nativized lexicon 140 to facilitate associating linguistic content in the first language with one or more phonemes from the second language. For example, the nativized lexicon 140 may represent a dictionary that includes a plurality of entries. A given entry in the nativized lexicon 140 may include first-language text 142 matched to second-language phonemic representation 144 by assignment 146. For example, the word "palace" in the English Language (e.g., first-language text 142) can be matched to the Spanish language phonemic representation /p/ /a/ /l/ /a/ /s/ (e.g., second-language phonemic representation 142) by the assignment 146. In some examples, the nativized lexicon 140 may be determined based on the cross-lingual dataset 130. For example, the system 100 may be configured to map English words in an English dictionary (e.g., first-language texts 142) with Spanish language phonemic representations (e.g., second-language phonemic representations 144) by identifying one or more Spanish language phonemes (e.g., second-language phonemes 134) that are assigned to the English language sounds (e.g., first-language speech sounds 132) by the cross-lingual assignments 136. Thus, in this example, the system 100 may generate the nativized lexicon 140 based on the cross-lingual dataset 130.

Figure 1B:
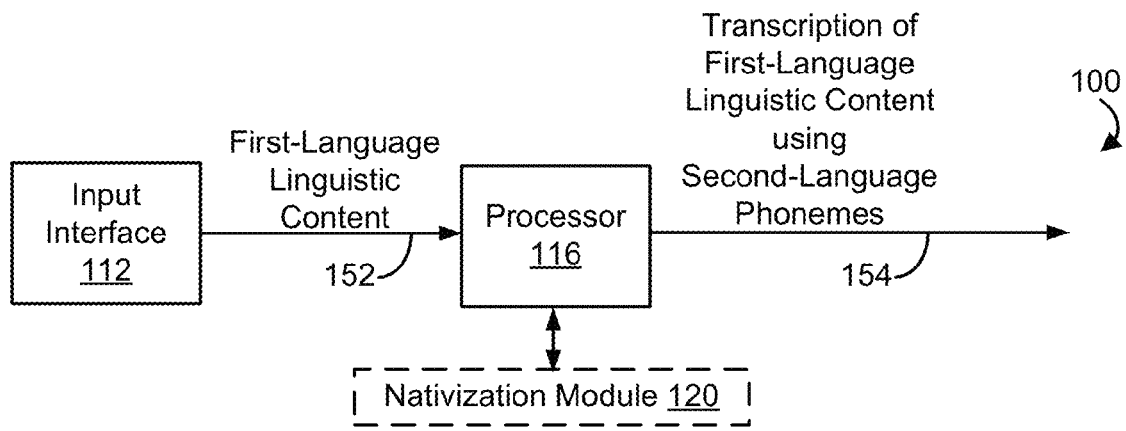
FIGS. 1B-1D illustrate example operations of the example system in FIG. 1A, in accordance with at least some embodiments described herein.
Figure 1C:
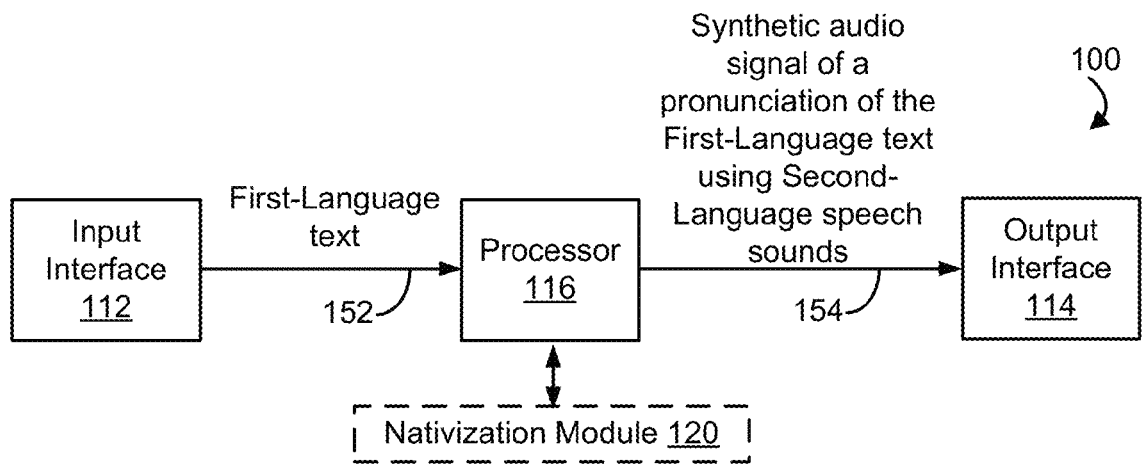
Figure 1D:
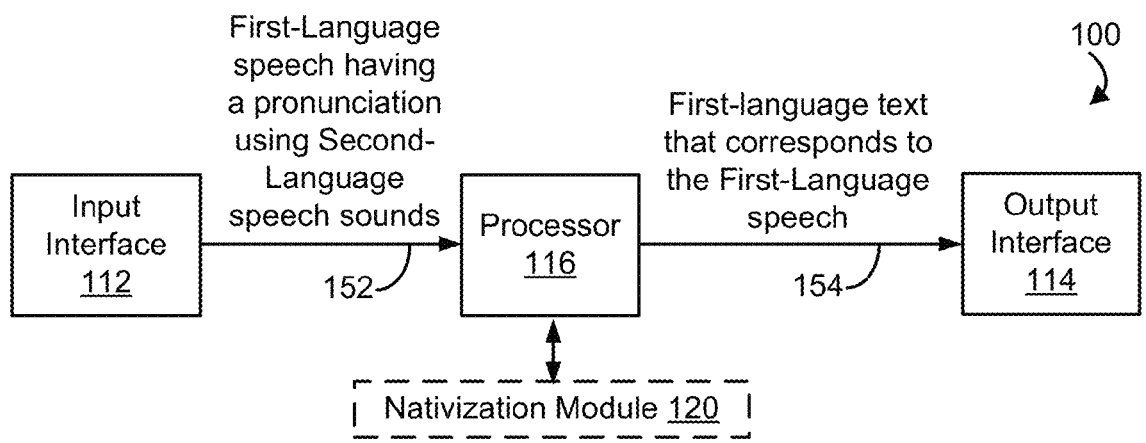

FIGS. 1B-1D illustrate example operations of the example system 100 in FIG. 1A, in accordance with at least some embodiments described herein. In FIG. 1B, the input interface 112 provides an input signal 152 to the processor 116. The input signal 152 includes first-language linguistic content. For example, the input signal 152 may include English language text (e.g., the word "palace"). The processor 116 then determines a transcription (e.g., phonemic representation) of the first-language linguistic content using second-language phonemes based on instructions from the nativization module 120. For example, the processor 116 may determine the Spanish language transcription /p/ /a/ /l/ /a/ /s/ for the English word "palace." The processor 116 may then output the determined transcription (e.g., phonemic representation) via the output signal 154. In some examples, the output signal 154 may go to an output device such as the devices described for the output interface 114 (e.g., speaker, display, etc.). In some examples, the output signal 154 may be provided to another processor for processing of the transcription to generate synthetic audio or text that corresponds to the transcription.

In FIG. 1C, the input signal 152 includes first-language text. For example, the first language text may be the English word "dog". In this example, the processor 116 then determines the phonemic representation of the English word "dog" using second-language phonemes (e.g., Spanish phonemes). For example, the determined phonemic representation may be the Spanish phonemes /d/ /o/ /g/ obtained by the nativization module 120 based on the cross-lingual dataset 130 illustrated in FIG. 1A. The processor 116 may then determine a synthetic audio signal that corresponds to the determined phonemic representation and provide the output signal 154 including the synthetic audio signal to the output interface 114. For example, the output interface 114 may include a speaker configured to generate audio that corresponds to a pronunciation of the first-language text using the second-language speech sounds based on the output signal 154.

In FIG. 1D, the input signal 152 includes first-language speech having a pronunciation using second-language speech sounds. For example, the input signal may include a recording of a Spanish speaker (second-language speech sounds) pronouncing the English word "face." Similarly, in this example, the processor 116 may determine the phonemic representation of the word using second-language phonemes (e.g., /f/ /e/ /s/) based on instructions from the nativization module 120. The processor 116 may then determine first-language text corresponding to the determined phonemic representation (e.g., "face") also based on the nativization module 120. For example, the nativization module 120 may obtain the text "face" from the nativized lexicon 140 illustrated in FIG. 1A. The processor 116 may then provide the determined first-language text in the output signal 154 to the output interface 114. For example, the output interface 114 may include a display panel configured to display the text (e.g., "face") based on the output signal 154.

In some examples, the implementation of the system 100 to generate the synthetic audio signal of FIG. 1C and/or the first-language text of FIG. 1D may include methods such as concatenative speech unit synthesis. In one example of concatenative speech unit synthesis, the system 100 may determine a hidden Markov model (HMM) chain that corresponds to the determined phonemic representation. For example, an HMM may model a system such as a Markov process with unobserved (i.e., hidden) states. Each HMM state may be represented as a multivariate Gaussian distribution that characterizes statistical behavior of the state. For example, the Gaussian distribution may include a representation of the first-language speech sound 132 (e.g., spectral features of the audio utterance) matched with the second-language phoneme 134 in the cross-lingual dataset 130 by the cross-lingual assignment 136. Additionally, each state may also be associated with one or more state transitions that specify a probability of making a transition from a current state to another state. Thus, the system 100 in the example of FIG. 1C may perform concatenative speech unit synthesis by concatenating speech units (e.g., speech sounds) that correspond to the HMM chain to generate the synthetic audio signal.

When applied to a speech processing system such as system 100, in some examples, the combination of the multivariate Gaussian distributions and the state transitions for each state may define a sequence of utterances corresponding to one or more phonemes. For example, the HMM may model the sequences of phonemes that define words. Thus, some HMM-based acoustic models may also take into account phoneme context when mapping a sequence of utterances to one or more words. In this example, the cross-lingual dataset may be implemented as an HMM model dataset that maps the first-language speech sounds 132 with the second-language phonemes 134.

In examples where words have multiple pronunciations (e.g., phonemic representations), the system 100 may disambiguate between the possible pronunciations using a mechanism such as Viterbi decoding. For example, the English word "the" may be represented with the phonemic representation /dh/ /ii/, or the phonemic representation /dh/ /ax/. In this example, the HMM-based acoustic model may assign the correct speech sound by applying a Viterbi decoding algorithm. Additionally or alternatively, the HMM-based acoustic model may utilize other speech processing techniques such as a phone mapping table. The phone mapping table may reduce the number of possible phonemic representations, for example, by defining legal mappings. An example legal mapping may include mapping vowels from the first language with vowels from the second language and not with consonants.

It is noted that the above example operations in FIGS. 1B-1D are for explanatory purposes only and are not meant to limit the format, content, and/or type of linguistic content in the input signal 152. For example, the first-language linguistic content may include content other than those described in the examples above. Additionally, the "first-language" and "second-language" as described above may include languages other than English and Spanish, such as French, German, Russian, etc. Additionally, some embodiments of the system 100 may include a first-language and a second-language that are related. For example, the first-language may be American English language and the second language may be Australian English language.

It is noted that the block diagrams shown in FIGS. 1A-D are described in connection with functional modules for convenience in description. For example, while the functional block in FIG. 1A shown as the cross-lingual dataset 130 may be included in the nativization module 120, the cross-lingual dataset 130 does not necessarily need to be implemented as being physically present in the nativization module 120 but can be present in another memory included in the device 110 or included in a second device (not shown in FIG. 1A). For example, the cross-lingual dataset 130 may be physically located in a remote server accessible to the nativization module 120 via a network. In some examples, embodiments of the device 110 may be arranged with one or more of the functional modules ("subsystems") implemented in a single chip, integrated circuit, and/or physical component.

Figure 2:
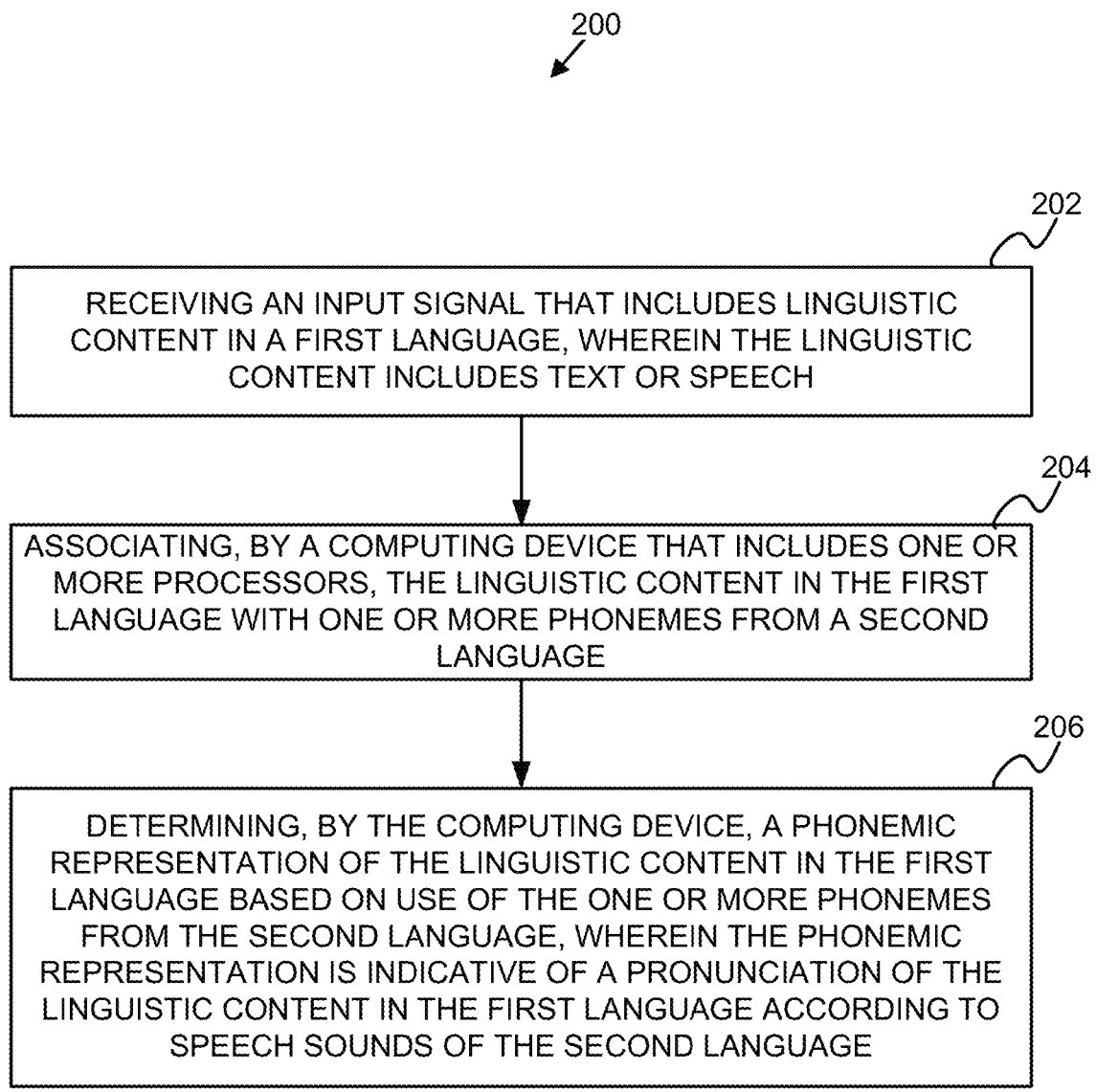
FIG. 2 is a block diagram of an example method for operation of a speech processing system, in accordance with at least some embodiments described herein.

FIG. 2 is a block diagram of an example method 200 for operation of a speech processing system, in accordance with at least some embodiments described herein. Method 200 shown in FIG. 2 presents an embodiment of a method that could be used with the system 100, for example. Method 200 may include one or more operations, functions, or actions as illustrated by one or more of blocks 202-206. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

At block 202, the method 200 includes receiving an input signal that includes linguistic content in a first language. The linguistic content may include text or speech. For example, a navigation system that includes Spanish language ASR and TTS systems may receive from a Spanish language speaker speech in the English language (e.g., first language) that includes directions to an address. For example, the speech could be the English name of a restaurant for which the user of the navigation system wants directions. In this example, the name of the restaurant may be pronounced by the Spanish language speaker (e.g., with a Spanish accent).

At block 204, the method 200 includes associating the linguistic content in the first language with one or more phonemes from a second language by a computing device that includes one or more processors. In the example of block 202, the second language may be the Spanish language. Thus, at block 204, the navigation system (e.g., computing device) may associate the first language speech (e.g., name of restaurant) with one or more phonemes from the second language (e.g., Spanish phonemes).

At block 206, the method 200 includes determining a phonemic representation of the linguistic content in the first language based on use of the one or more phonemes from the second language by the computing device. The phonemic representation may be indicative of a pronunciation of the linguistic content in the first language according to speech sounds of the second language. In the example of the navigation system, the phonemic representation may represent the Spanish speaker's pronunciation of the restaurant's name in English. Thus, for example, the navigation system may be able to recognize the English language restaurant name based on the Spanish Speaker's pronunciation and then provide directions to the restaurant.

Figure 3:
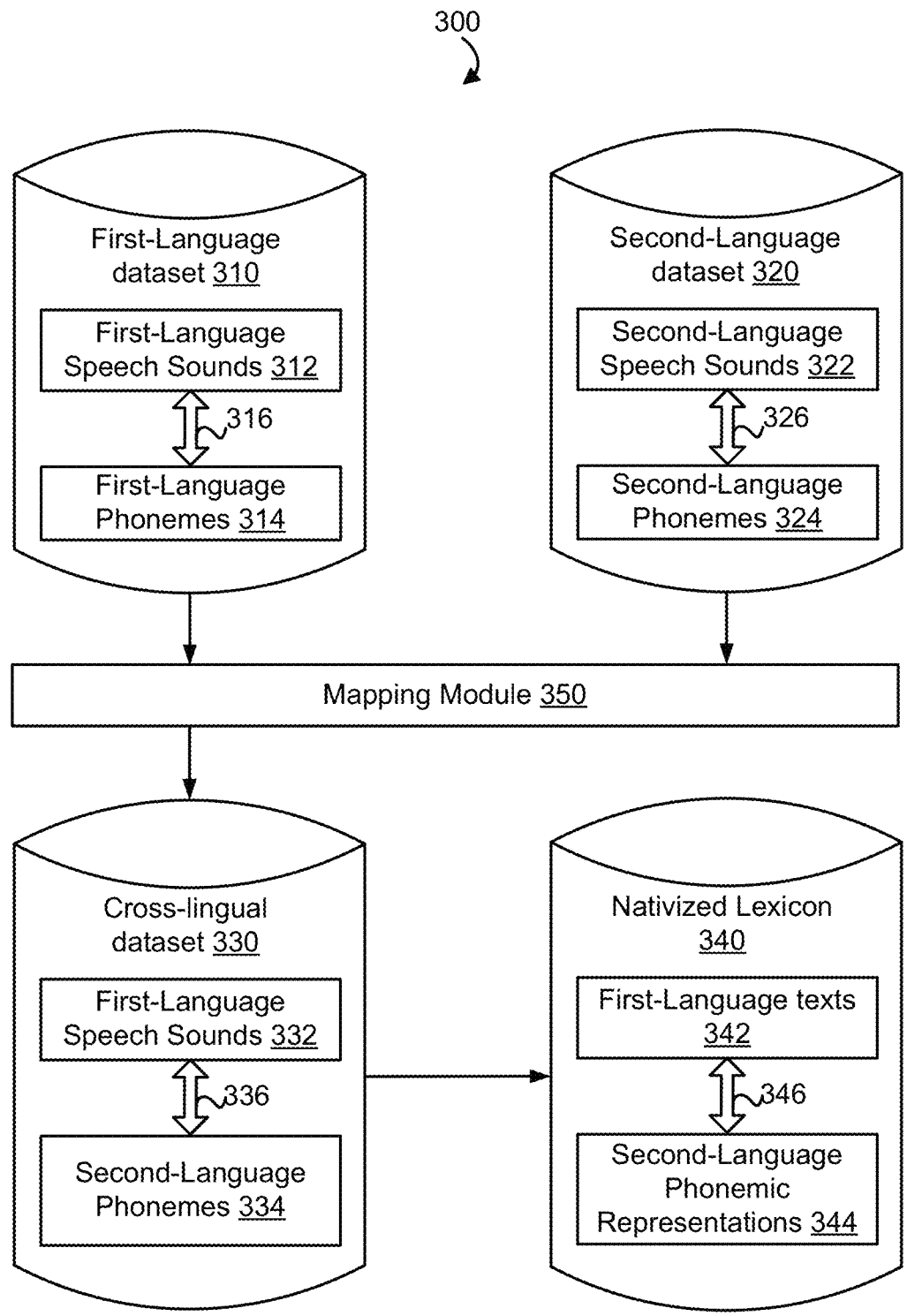
FIG. 3 illustrates an example system for generating a cross-lingual dataset and a nativized lexicon, in accordance with at least some embodiments described herein.

FIG. 3 illustrates an example system 300 for generating a cross-lingual dataset 330 and a nativized lexicon 340, in accordance with at least some embodiments described herein. The structure and function of the cross-lingual dataset 330 and the nativized lexicon 340 may be similar, respectively, to the cross-lingual dataset 130 and the nativized lexicon 140 in the description of the system 100. Additionally, the functions of the system 300 may be performed by a computing device such as the device 110 in the system 100 or any other computing device configured to generate the cross-lingual dataset 330 and/or the nativized lexicon 340. For example, the system 300 may be included in a remote server configured to communicate with the device 110 over a wired and/or wireless network. In this example, the remote server may then communicate the cross-lingual dataset 330 and/or the nativized lexicon 340 generated by the system 300 to the device 110 to facilitate performing the functions described in the system 100 such as determining phonemic representation of linguistic content in a first language using one or more phonemes from a second language.

The system 300 comprises a first-language dataset 310 that includes a plurality of first-language speech sounds 312 matched to a plurality of first-language phonemes 314 by first-language assignments 316. The implementation and structure of the first-language dataset 310 is similar to the cross-lingual dataset 130 of the system 100. For example, the first-language dataset 310 includes first-language assignments 316, similarly to the cross-lingual assignments 136 in the system 100, for matching the first-language speech sounds 312 with the first-language phonemes 314. Thus, the first-language dataset 310 may be utilized to determine a phonemic representation of linguistic content in the first language based on use of one or more phonemes from the first language. For example, the English word "dog" spoken by an English language speaker may be mapped to the English language phonemic representation /d/ /aw/ /g/ based on the first-language dataset 310. Additionally, the implementation of the first-language dataset 310 may be similar to the cross-lingual dataset 130 in the system 100. For example, the first-language dataset 310 may be implemented as an HMM-based acoustic model dataset.

The function, implementation, and structure of a second-language dataset 320 included in the system 300 is similar to the first-language dataset 310. However, the second-language dataset 320 facilitates mapping speech in the second language with phonemic representations using phonemes from the second language. For example, the second-language dataset 320 includes a plurality of second-language speech sounds 322 assigned to a plurality of second-language phonemes 324 by second-language assignments 326.

In the system 300, a mapping module 350 may be configured to process information from the first-language dataset 310 and the second-language dataset 320 to generate the cross-lingual dataset 330. The mapping module 350 may be implemented as a software component similar to the implementation of the nativization module 120 in the system 100. To facilitate the mapping, for example, the mapping module 350 may compare the first-language speech sounds 312 with the second-language speech sounds 322. Based on the comparison, the mapping module 350 may then determine cross-lingual assignments 336 in the cross-lingual dataset 330. For example, the mapping module 350 may record the first-language speech sounds 312 in the first-language dataset 310 as the first-language speech sounds 332 in the cross-lingual dataset 330. The mapping module 350 may then identify second-language speech sounds from the plurality of second-langue speech sounds 322 that are similar to a corresponding first-language speech sound of the plurality of first-language speech sounds 332. The mapping module 350 may then assign (e.g., in the cross-lingual assignments 336) the second-language phoneme 324 assigned to the identified second-language speech sound 322 (e.g., in the second-language assignments 326) to the corresponding first-language speech sound 332. For example, the determined assignment may be recorded in the cross-lingual assignments 336 included in the cross-lingual dataset 336. The process of mapping the first-language speech sounds 332 to the second-language phonemes 334 by the mapping module 350 may be performed by various methods and/or algorithms such as those contemplated in the present disclosure.

In some examples, the system 300 may then generate the nativized lexicon 340 based on the cross-lingual dataset 330. Similarly to the nativized lexicon 140 of FIG. 1A, the nativized lexicon 340 may define established mapping 346 between words (e.g., first-language texts 342) in the first language and transcriptions (e.g., second-language phonemic representations 344) in the second language. The mapping 346 may include a list of phoneme-pattern-to-word mappings, for example, between the first language and the second language. Thus, in some examples, the nativized lexicon 340 may include a lookup table, such as Table 1 shown below. Table 1 illustrates an example of how the nativized lexicon 340 may list second-language phonemic representations 344 matched with corresponding first-language texts 342 (e.g., words) that a system such as system 100 and/or system 300 is attempting to associate. Thus, the nativized lexicon 340 may be used when determining phonemic representations of linguistic content in the first language using one or more phonemes from the second language. For exemplary purposes, in table 1, the first language is the English language and the second language is the Spanish language.

TABLE 1

| First-language texts 342 | Second-Language Phonemic Representations 344 |
|---|---|
| palace | /p/ /a/ /l/ /a/ /s/ |
| cat | /k/ /a/ /t/ |
| dog | /d/ /o/ /g/ |

The first-language texts 342 in table 1, for example, may not be present in a second-language lexicon. For example, the English words "palace," "cat," and "dog" are not present in a Spanish language lexicon (e.g., dictionary). Additionally, a first-language lexicon may not include the second-language phonemic representations 344 in Table 1. To illustrate this point, Table 2 illustrates examples of how the first-language lexicon including the same words as Table 1 may look like. In table 2, the first language is the English language.

TABLE 2

| First-language texts | First-Language Phonemic Representations |
|---|---|
| palace | /p/ /ax/ /l/ /aa/ /s/ |
| cat | /k/ /ae/ /t/ |
| dog | /d/ /aw/ /g/ |

It is noted that the first-language texts 342 in table 1 and 2 are only examples. In practice, the nativized lexicon 340 may include numerous words in the first language (e.g., first-language texts 342) matched with numerous corresponding second-language phonemic representations 344. Additionally, the determined second-language phonemic representations 344 may be different than the ones illustrated in table 1. For example, the Spanish language phonemic representation determined by the system 300 for the English word "dog" may be /d/ /o/ /x/ rather than /d/ /o/ /g/ as illustrated in table 1.

Figure 4:
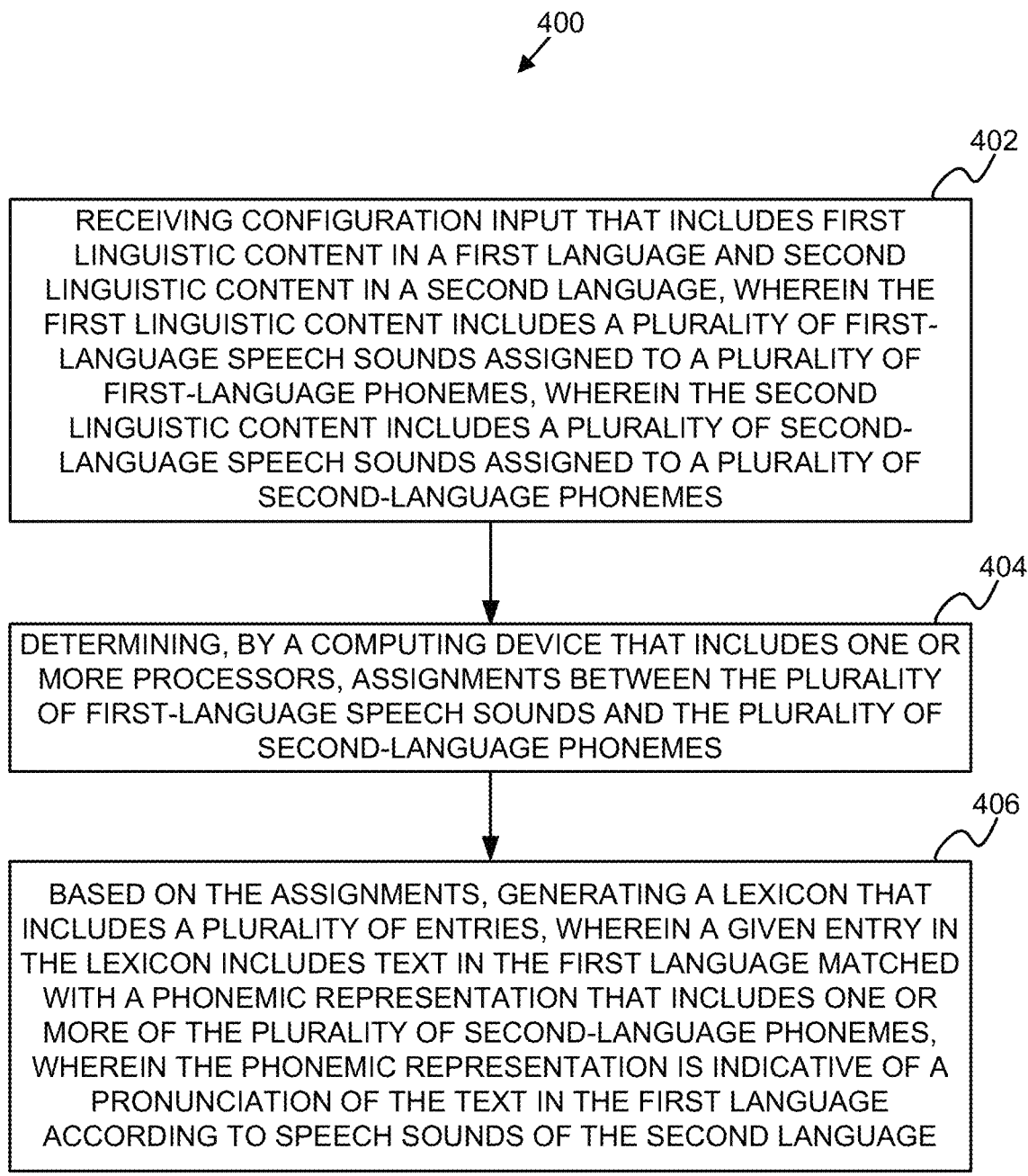
FIG. 4 is a block diagram of an example method for generating a nativized lexicon, in accordance with at least some embodiments described herein.

FIG. 4 is a block diagram of an example method 400 for generating a nativized lexicon, in accordance with at least some embodiments described herein. Method 400 shown in FIG. 4 presents an embodiment of a method that could be used with the systems 100 and/or 300, for example. Method 400 may include one or more operations, functions, or actions as illustrated by one or more of 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the method 400 includes receiving configuration input that includes first linguistic content in a first language and second linguistic content in a second language. The first linguistic content includes a plurality of first-language speech sounds assigned to a plurality of first-language phonemes. The second linguistic content includes a plurality of second-language speech sounds assigned to a plurality of second-language phonemes.

For example, a computing device such as a server may be configured to generate a nativized lexicon such as the nativized lexicons 140 and 340 described in FIGS. 1A and 3. The server may receive configuration input that includes information such as the information in the first-language dataset 310 and the second-language dataset 320. For example, the server may receive an audio signal including speech in the first language and a corresponding text in the first language that matches the speech content in the audio signal. In this example, the server may then determine a phonemic representation of the text and determine assignments between one or more phonemes in the phonemic representation and a portion of the audio signal. The determined assignments may be similar to the first-language assignments 316 in the system 300 for example. Thus, the server may determine a first-language dataset similar to the first-language dataset 310 of the system 300. Similarly, the server may determine a second-language dataset (e.g., similarly to second-language dataset 320 in system 300).

At block 404, the method 400 includes determining assignments between the plurality of first-language speech sounds and the plurality of second-language phonemes by a computing device that includes one or more processors. Referring back to the server example above, at block 404, the server may include a mapping module similar to mapping module 350 of system 300. The server may then process the information received at block 402 to determine a cross-lingual dataset similar to the cross-lingual dataset 330 of system 300 that includes assignments between the first-language speech sounds and the second-language phonemes (e.g., similar to cross-lingual assignments 336).

At block 406, the method 400 includes generating a lexicon that includes a plurality of entries based on the assignments. A given entry in the lexicon includes text in the first language matched with a phonemic representation that includes one or more of the plurality of second-language phonemes. The phonemic representation may be indicative of a pronunciation of the text in the first language according to speech sounds of the second language. Referring back to the server example, at block 406, the server may then generate the lexicon such as the nativized lexicon 340 of system 300, for example, based on the determined cross-lingual dataset that includes the assignments between the first-language speech sounds and the second-language phonemes. For example, the server may obtain words from a first-language lexicon and match the words with second-language phonemic representations to generate the nativized lexicon as described in FIG. 3.

Figure 5:
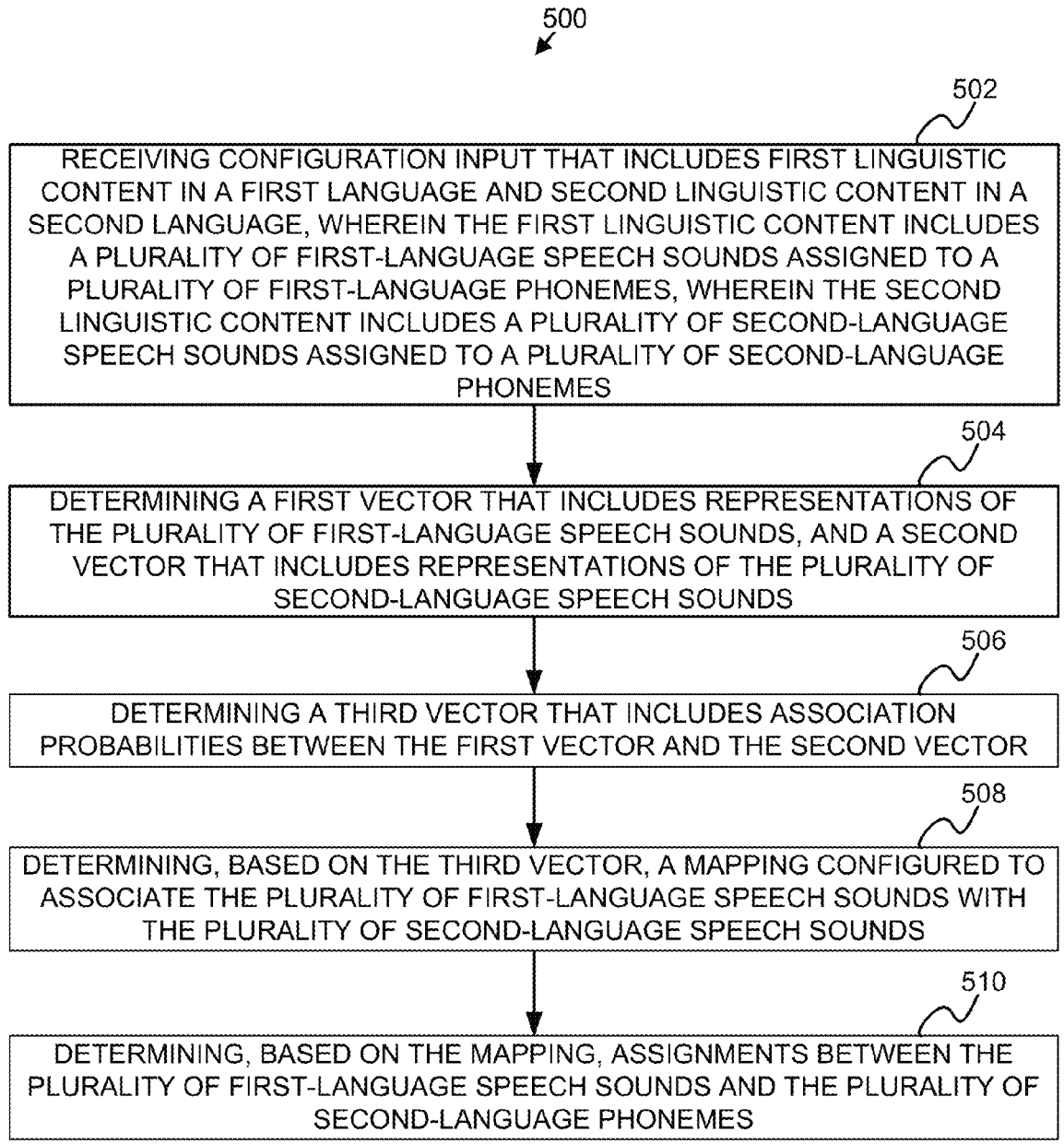
FIG. 5 is a block diagram of an example method for determining cross-lingual assignments, in accordance with at least some embodiments described herein.

FIG. 5 is a block diagram of an example method 500 for determining cross-lingual assignments, in accordance with at least some embodiments described herein. Method 500 shown in FIG. 5 presents an embodiment of a method that could be used with the systems 100 and/or 300, for example. Method 500 may include one or more operations, functions, or actions as illustrated by one or more of 502-510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

The method 500 may be an example method for generating cross-lingual assignments 136 or 336 in the systems 100 or 300, for example. Additionally, the method 500 may describe a process for determining the mapping module 350 in the system 300, for example. In some examples, the method 500 may describe the process for associating linguistic content in a first language with one or more phonemes from a second language. For example, the system 500 may provide a method for automated generation of the nativized lexicon 340 in the system 300 based on configuration input that includes a first audio signal in the first language, corresponding text in the first language, a second audio signal in the second language, and corresponding text in the second language. Thus, the method 500 describes some embodiments of the present disclosure for automatic generation of a nativized lexicon such as the nativized lexicons 140 and 340.

At block 502, the method 500 includes receiving configuration input that includes first linguistic content in a first language and second linguistic content in a second language. The first linguistic content includes a plurality of first-language speech sounds assigned to a plurality of first-language phonemes. The second linguistic content includes a plurality of second-language speech sounds assigned to a plurality of second-language phonemes.

At block 504, the method 500 includes determining a first vector that includes representations of the plurality of first-language speech sounds, and a second vector that includes representations of the plurality of second-language speech sounds.

The method 500 (or portions thereof) may provide an example framework for conversion between first-language speech sounds and second-language phonemes. For example, the configuration input described in block 502 may be received by a mapper (e.g., software component in a speech processing system such as systems 100 or 300). The mapper may then parse the configuration input to determine first-language assignments and second-language assignments such as those in the first-language dataset 310 and the second-language dataset 320 of system 300.

In some examples, representations of the first-language speech sounds and the second-language speech sounds, may be stored in the first-language dataset 310 and the second-language dataset 320 described above in the system 300. For example, the first-language dataset may correspond to Hidden Markov Models (HMMs) that simulate the first-language speech sounds. In some examples, the mapper may determine a multivariate Gaussian distribution for each HMM that corresponds to one or more spectral features of the first-language speech sound. For example, a given Gaussian distribution may include a Mel-Cepstral representation of a spectral envelope of a given first-language speech sound. Additionally, in some examples, the given Gaussian distribution may be augmented by delta-coefficients and/or delta-delta coefficients.

By assembling the first vector with Gaussian distributions of the first-language speech sounds and the second vector with Gaussian distributions of the second-language speech sounds, the method 500 may then associate the first-language speech sounds with the second-language speech sounds by solving an optimization problem for example. In some examples, the first vector and the second vector may include or be based on the means of the Gaussian distributions and not the weights (e.g., probabilities) of the Gaussian distributions. The optimization problem, for instance, may attempt to formulate the following transformation function:

$$y=F(x) \quad [1]$$

In equation [1] above, x belongs to an X space that includes the Gaussian distributions of the first vector and y belongs to a Y space that includes the Gaussian distributions of the second vector. For example, the X space may correspond to an input space and the Y space may correspond to an output space. Thus, for example, equation [1] may represent a solution for the optimization problem that corresponds to the mapping module 350 of the system 300. For example, equation [1] may provide parametric mapping from the X space to the Y space. Further, the equation [1] may be utilized to associate second-language speech sounds with first-language speech sounds to compensate inter-speaker differences between the first language and the second language for example. On the other hand, the equation [1] may also provide non-parametric mapping from the Y space to the X space for example.

In examples where there are N first-language speech sounds in the x space and Q second-language speech sounds in the y space, a given first-language speech sound and a given second-language speech sound may be represented, respectively, as $y_q$ and $x_n$, where q and n are real integers in the ranges, respectively, 1 to Q and 1 to N. Further, a distortion metric $d(y_q, x_n)$ between the first vector x and the second vector y may be expressed as:

$$d(y_q, x_n) = (y_q - F(x_n))^T W_q (y_q - F(x_n)) \quad [2]$$

The distortion metric in equation [2] describes the distortion (e.g., distance) between $y_q$ and $x_n$. Additionally, in equation [2], $W_q$ is a weighting matrix depending on the second vector y. The weighting matrix may allow incorporating frequency weighting in the distortion metric for example. Further, in some examples, a joint probability of matching $y_q$ and $x_n$ may be expressed as $p(y_q, x_n)$. For example, the average distortion D for all possible vector combinations in equation [1] may be expressed as:

$$D = \Sigma_{n,q} p(y_q, x_n) d(y_q, x_n) = \Sigma_q p(y_q) \Sigma_n p(x_n|y_q) d(y_q, x_n) \quad [3]$$

The association probabilities $p(x_n|y_q)$ in equation [3] indicate the mapping and/or association between a given first-language speech sound corresponding to $x_n$ and a given second-language speech sound corresponding to $y_q$. Additionally, in some examples, the y space probabilities $p(y_q)$ in equation [3] may be to be uniformly distributed for all Q. In other words, $$p(y_q) = \frac{1}{Q}.$$

In some examples, equation [3] may imply that for every second-language speech sound, equation [1] will assign at least one first-language speech sound, while some first-language speech sounds may not have a matching second-language speech sound. In other examples, the relationship may be opposite. Thus, a bi-directional nature of the mapping (e.g., parametric from Y space to X space, non-parametric from X space to Y space) may be implied by the distortion equation [3] for example.

The properties of equation [3] described above may be advantageous in some examples. For example, using method 500, cross-lingual assignments 336 in the system 300 may be determined based on the first linguistic content and the second linguistic content. In other words, there may be no need for exhaustive audio/text input that includes all the possible phonemes in the first language or the second language for example.

Additionally, in this example, by minimizing the average distortion D and the association probabilities $p(x_n|y_q)$ simultaneously in equation [3], the optimization problem may be solved to determine the optimal mapping of the equation [1].

At block 506, the method 500 includes determining a third vector that includes association probabilities between the first vector and the second vector. Below is an example computation by the example mapper for determining the association probabilities $p(x_n|y_q)$.

The mapper, for example, may simulate the distortion metric of equation [2] as a distance function. Thus, in this example, the computation may involve determining the minimum distance between a given Gaussian distribution mean of the first vector (e.g., $x_n$) and a given Gaussian distribution mean of the second vector (e.g., $y_q$). In other words, the mapper may be configured to identify a given first-language speech sound that is proximal to a given second-language speech sound for example. For instance, for a given y space vector, a nearest neighbor search $I(q)$ for the nearest x space vector may be expressed as:

$$I(q) = \operatorname{argmin}_n \{d(y_q, x_n)\} \quad [4]$$

In this example, the association probabilities in the third vector may then be computed by the mapper as the expression:

$$p(x_n | y_q) = \begin{cases} 1, & n = I(q) \\ 0, & \text{otherwise} \end{cases} \quad [5]$$

For example, according to equation [5], the association probabilities map second-language speech sounds from the Y space to first-language speech sounds from the X space.

It is noted that the example above is for example purposes and other computations may be possible to determine the association probabilities. For example, deterministic annealing computations involving an annealing temperature may be alternatively used.

At block 508, the method 500 includes determining a mapping configured to associate the plurality of first-language speech sounds to the plurality of second-language speech sounds based on the third vector. In the mapper example, the mapping may be represented as the transformation function of equation [1].

For example, the optimization problem described in the previous blocks may be solved based on the third vector in block 508. One example solution may involve performing a linear regression. For example, the transformation function of equation [1] may be represented as a mixture-of-linear regressions function expressed as:

$$F(x_n) = \Sigma_{k=1}^K p(k|x_n)[\mu_k + \Sigma_k x_n], \quad [6]$$

where $\mu_k$ is a bias vector of the linear regression, $\Sigma_k$ is a linear transformation matrix of the k-th class, and $p(k|x_n)$ is the probability that $x_n$ belongs to the k-th class. Note that the linear transformation matrix $\Sigma_k$ is in matrix form. In some examples, the matrix form may be inconvenient, thus, the linear transformation matrix $\Sigma_k$ may be reformulated by using a vector operator vec{ } and a Kronecker product:

$$\Sigma_k x_n = \operatorname{vec}\{\Sigma_k x_n\} = (x_n^T \otimes I_D) \operatorname{vec}\{\Sigma_k\} = (x_n^T \otimes I_D)\sigma_k, \quad [7]$$

where $\sigma_k$ is a vectorized transformation matrix of $\Sigma_k$, and $I_D$ is an identity matrix. Note that the operator vec{ } is simply rearranging the parameters of $\Sigma_k$ by stacking together the columns of the matrix.

In some examples, the transform vector $\Sigma_k$ may be structured. In these examples, the structure may be incorporated in equation [7] with a repetition matrix R. The repetition matrix R may include zeros and ones at the appropriate location to incorporate the structure of the transform vector $\Sigma_k$ for example. The inclusion of the repetition matrix R may yield the following expression:

$$\Sigma_k x_n = (x_n^T \otimes I_D) R \sigma_k' = X_n \sigma_k', \quad [8]$$

where $\sigma_k'$ includes free parameters of the structured matrix, and $X_n$ is an X-space data matrix that includes recanted information of $x_n$.

In some examples, the data matrix $X_n$ may be sparse. In these examples, the linear transformation matrix $\Sigma_k$ may be constrained as the block transform matrix expression:

$$\sum\nolimits_k = \begin{bmatrix} \Sigma_k' & 0 & 0 \\ 0 & \Sigma_k' & 0 \\ 0 & 0 & \Sigma_k' \end{bmatrix} \quad [9]$$

In the example of equation [9], $\sigma_k' = \operatorname{vec}\{\Sigma_k'\}$.

Further, the transformation function $F(x_n)$ (e.g., mapping) may then be expressed as a simple linear regression:

$$F(x_n) = \Delta_n \mu + B_n \sigma = [\Delta_n \quad B_n] \begin{bmatrix} \mu \\ \sigma \end{bmatrix} = \Gamma_n \gamma, \quad [10]$$

where:

$$\Delta_n = [\, p(k=1|x_n)I_D \quad p(k=2|x_n)I_D \quad \ldots \quad p(k=K|x_n)I_D \,], \quad [11]$$

$$\mu = [\, \mu_1^T \quad \mu_2^T \quad \ldots \quad \mu_K^T \,]^T, \quad [12]$$

$$B_n = [\, p(k=1|x_n)X_n \quad p(k=2|x_n)X_n \quad \ldots \quad p(k=K|x_n)X_n \,], \quad [13]$$

$$\sigma = [\, \sigma_1'^T \quad \sigma_2'^T \quad \ldots \quad \sigma_K'^T \,]^T. \quad [14]$$

Further, the optimization problem may then be solved by minimizing the average distortion D of equation [3] with respect to the linear regression variable γ. For example, a corresponding partial derivative may be equated to zero:

$$\frac{\partial D'}{\partial \gamma} = 0, \quad [15]$$

which yields the following solution for γ:

$$\gamma = (\Sigma_q p(y_q) \Sigma_n p(x_n|y_q) \Gamma_n^T W_q \Gamma_n)^{-1} (\Sigma_q p(y_q) \Sigma_n p(x_n|y_q) \Gamma_n^T W_q y_q) \quad [16]$$

Note that the solution in equation [16] includes the association probabilities $p(x_n|y_q)$ from the third vector determined at block 506. Thus, at block 508, the mapping (e.g., equation [1]) may be determined based on the third vector. In some examples, the linear regression computation may involve repeating blocks 506 and 508 until convergence of the linear regression variables, for example, in the equation [10].

At block 510, the method 500 includes determining assignments between the plurality of first-language speech sounds and the plurality of second-language phonemes based on the mapping. Referring back to the mapper example, the mapping determined in block 508 may associate the first-language speech sounds with the second-language speech sounds. Consequently, in block 510, assignments such as the cross-lingual assignments 336 in system 300 may be determined between the plurality of first-language speech sounds and the plurality of second-language phonemes.

Figure 6:
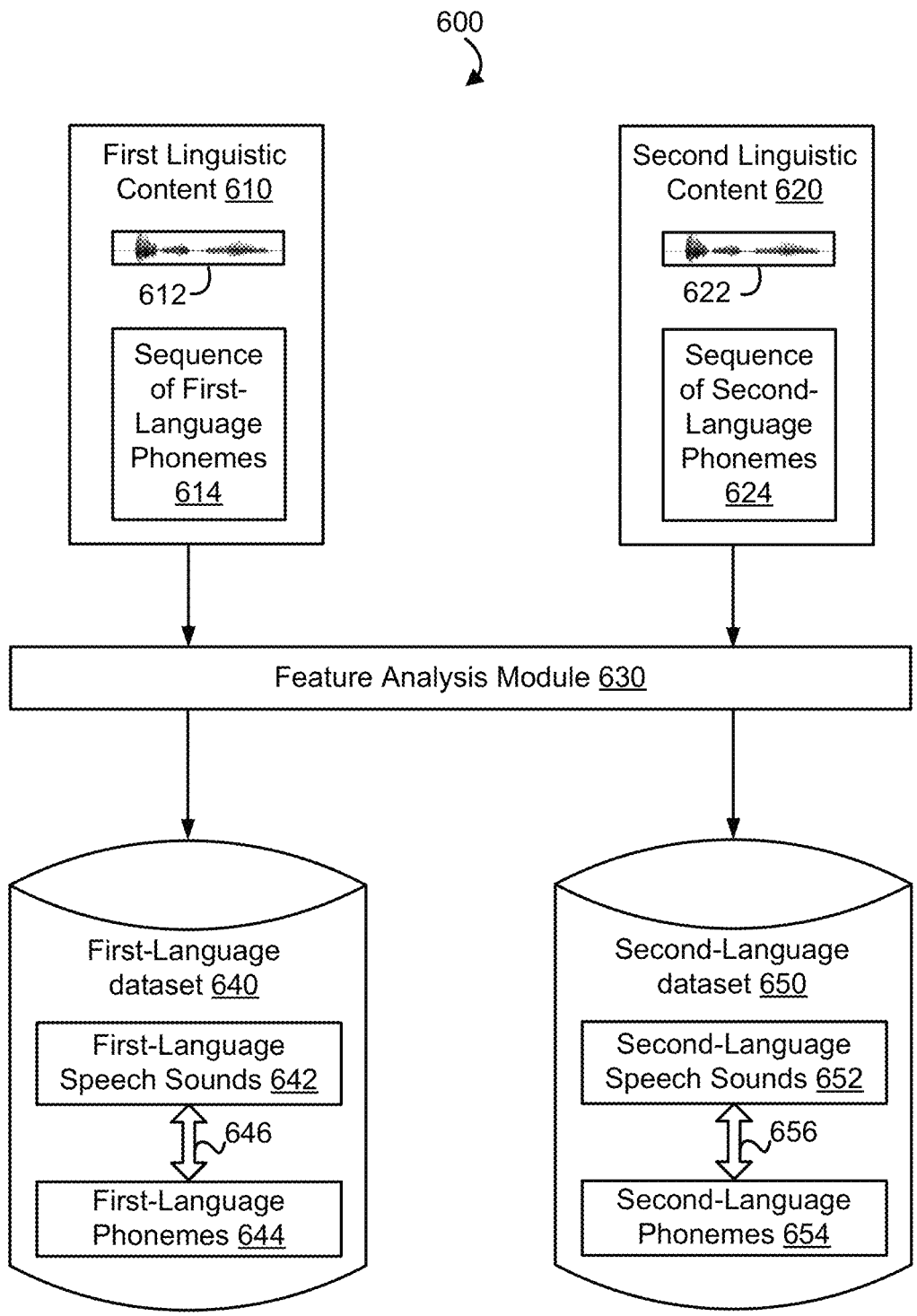
FIG. 6 illustrates an example system for generating a first-language dataset and a second-language dataset, in accordance with at least some embodiments described herein.

FIG. 6 illustrates an example system 600 for generating a first-language dataset 640 and a second-language dataset 650, in accordance with at least some embodiments described herein. The structure and function of the first-language dataset 640 and the second-language dataset 650 may be similar, respectively, to the first-language dataset 310 and the second-language dataset 320 in the description of the system 300. For example, the system 600 may generate the first-language dataset 310 and the second-language dataset 320 for use by the system 300. Additionally, the functions of the system 600 may be performed by a computing device such as the device 110 in the system 100 or any other computing device configured to generate the first-language dataset 640 and/or the second-language dataset 650.

First linguistic content 610 in the system 600 includes a first audio signal 612 and a sequence of first-language phonemes 614. The first linguistic content 610 may be included, for example, in configuration input provided to the system 600 for determining and generating the first-language dataset 640. The first audio signal 612 may include speech content in a first language, and the sequence of first-language phonemes 614 may correspond to the speech content in the first audio signal 612. For example, the first audio signal 612 may comprise a recitation of a movie script in the first language, and the sequence of first-language phonemes 614 may comprise first-language phonemes that correspond to the movie script. For example, a given phoneme of the sequence of first-language phonemes 614 may correspond to a portion of the first audio signal 612.

Similarly, second-language linguistic content 620 includes a second audio signal 622 in a second language and a corresponding sequence of second-language phonemes 624. For example, the second audio signal 622 may include speech content in the second language such as a recitation of a magazine article, where a given second-language phoneme of the sequence of second-language phonemes 624 may correspond to a portion of the second audio signal 622.

Feature analysis module 630 in the system 600 may be implemented as a software component such as the software components included in memory 118 of the system 100. The feature analysis module 630 may be configured to receive the first linguistic content 610 and determine first-language speech sounds 642 from the first audio signal 612. Further, the feature analysis module 630 may assign first-language phonemes 644 from the sequence of first-language phonemes 614 to the determined first-language speech sounds 642. Thus, the feature analysis module 630 may, for example, determine the first-language dataset 640 that includes first-language speech sounds 642 assigned to first-language phonemes 644 by first-language assignments 646. Similarly, the feature analysis module 630 may determine the second-language dataset 650 based on the second linguistic content 620. For example, the second-language 650 may include second-language speech sounds 652 assigned to second-language phonemes 654 by second-language assignments 656.

Thus, system 600 provides an example system for generating first-language dataset 640 and second-language dataset 650, that are similar to first-language dataset 310 and second-language dataset 320 provided in system 300 for example.

Figure 7:
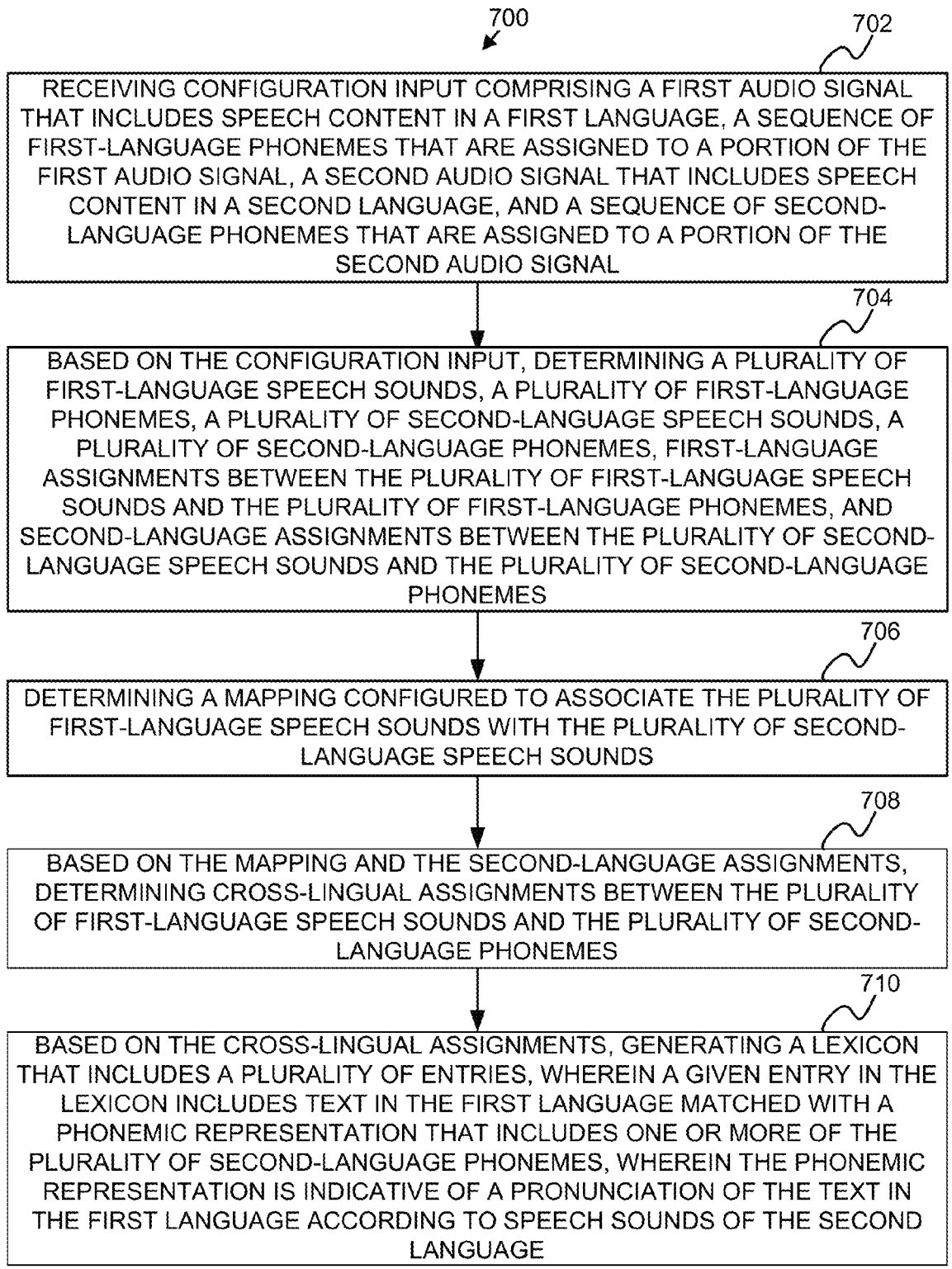
FIG. 7 is a block diagram of an example method for generating a nativized lexicon based on first-language speech and text samples and second-language speech and text samples, in accordance with at least some embodiments described herein.

FIG. 7 is a block diagram of an example method 700 for generating a nativized lexicon based on first-language speech and text samples and second-language speech and text samples, in accordance with at least some embodiments described herein. Method 700 shown in FIG. 7 presents an embodiment of a method that could be used with the systems 100, 300 and/or 600, for example. Method 700 may include one or more operations, functions, or actions as illustrated by one or more of 702-710. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, the method 700 includes receiving configuration input comprising a first audio signal that includes speech content in a first language, a sequence of first-language phonemes that are assigned to a portion of the first audio signal, a second audio signal that includes speech content in a second language, and a sequence of second-language phonemes that are assigned to a portion of the second audio signal. For example, a computing device such as a server may receive the configuration input from a first-language speaker and a second-language speaker. In some examples, the computing device may provide to the first-language speaker text in the first language that corresponds to the sequence of first-language phonemes, and collect the first-language speech sounds from recited speech by the first-language speaker that corresponds to the provided text.

At block 704, the method 700 includes determining a plurality of first-language speech sounds, a plurality of first-language phonemes, a plurality of second-language speech sounds, a plurality of second-language phonemes, first-language assignments between the plurality of first-language speech sounds and the plurality of first-language phonemes, and second-language assignments between the plurality of second-language speech sounds and the plurality of second-language phonemes based on the configuration input. For example, the computing device in the example above may perform functions similar to that of the feature analysis module 630 described in the system 600.

At block 706, the method 700 includes determining a mapping configured to associate the plurality of first-language speech sounds with the plurality of second-language speech sounds. For example, the computing device may determine the mapping similar to mapping module 350 of the system 300, for example, by performing a linear regression such as that performed in the method 500.

At block 708, the method 700 includes determining cross-lingual assignments between the plurality of first-language speech sounds and the plurality of second-language phonemes based on the mapping and the second-language assignments. In the server example, block 708 may include, for example, determining a cross-lingual dataset that associates first-language speech sounds with second-language phonemes, such as the cross-lingual dataset 330 of system 300. For example, the server may utilize a mapping module such as the mapping module 350 of system 300 to associate a given first-language speech sound to a given second-language speech sound, and then match a given second-language phoneme associated to the given second-language speech sound by the second-language assignments to the given first-language speech sound. Consequently, the first-language speech sounds may be associated by the server to second-language phonemes.

At block 710, the method 700 includes generating a lexicon that includes a plurality of entries, wherein a given entry in the lexicon includes text in the first language matched with a phonemic representation that includes one or more of the plurality of second-language phonemes, wherein the phonemic representation is indicative of a pronunciation of the text in the first language according to speech sounds of the second language.

For example, the server may then, based on the cross-lingual assignments, generate a nativized lexicon similar to the nativized lexicons 140 and 340 of systems 100 and 300. Thus, the method 700 provides a mechanism for automated generation of such lexicon based on the first linguistic content in the first language and the second linguistic content in the second language for example.

Figure 8:
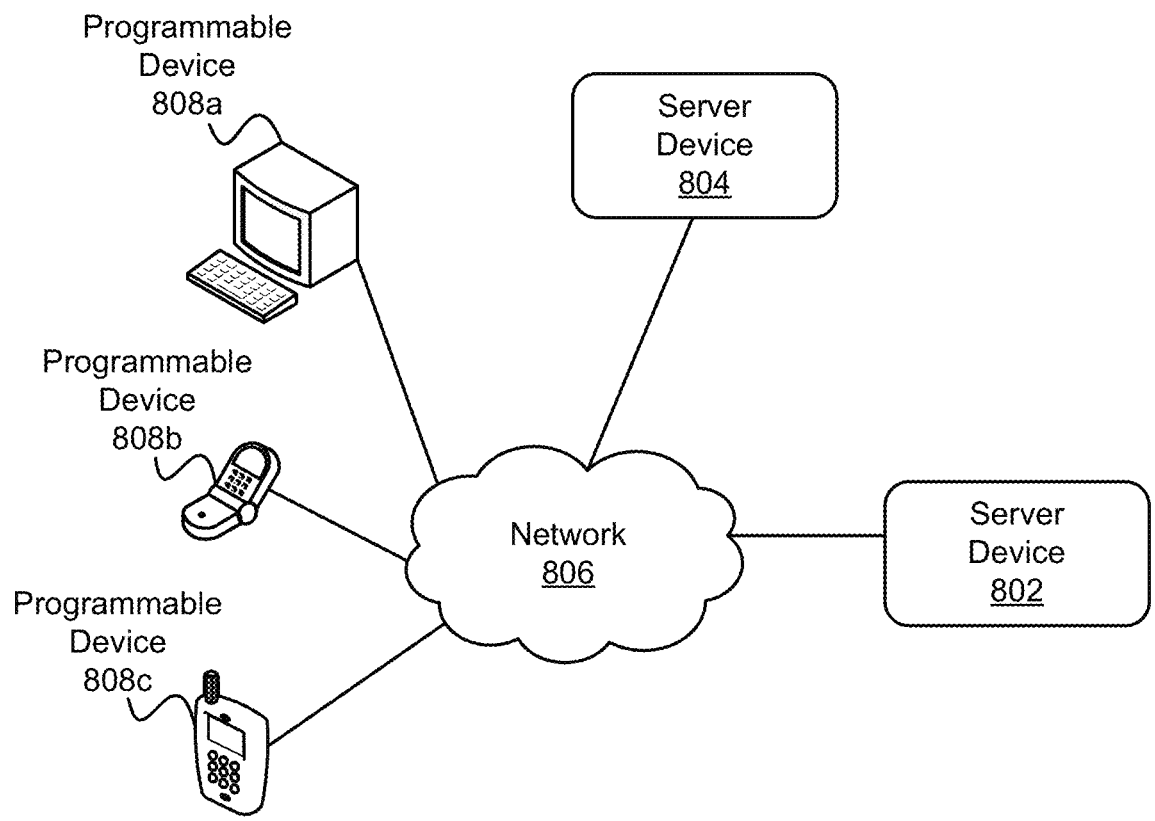
FIG. 8 illustrates an example distributed computing architecture, in accordance with at least some embodiments described herein.

FIG. 8 illustrates an example distributed computing architecture, in accordance with an example embodiment. FIG. 8 shows server devices 802 and 804 configured to communicate, via network 806, with programmable devices 808a, 808b, and 808c. The network 806 may correspond to a LAN, a wide area network (WAN), a corporate intranet, the public Internet, or any other type of network configured to provide a communications path between networked computing devices. The network 806 may also correspond to a combination of one or more LANs, WANs, corporate intranets, and/or the public Internet.

Although FIG. 8 shows three programmable devices, distributed application architectures may serve tens, hundreds, or thousands of programmable devices. Moreover, the programmable devices 808a, 808b, and 808c (or any additional programmable devices) may be any sort of computing device, such as an ordinary laptop computer, desktop computer, network terminal, wireless communication device (e.g., a tablet, a cell phone or smart phone, a wearable computing device, etc.), and so on. In some examples, the programmable devices 808a, 808b, and 808c may be dedicated to the design and use of software applications. In other examples, the programmable devices 808a, 808b, and 808c may be general purpose computers that are configured to perform a number of tasks and may not be dedicated to software development tools. For example the programmable devices 808a-808c may be configured to provide speech processing functionality similar to that discussed in FIGS. 1-7. For example, the programmable devices 808a-c may include a device such as the device 110 of system 100.

The server devices 802 and 804 can be configured to perform one or more services, as requested by programmable devices 808a, 808b, and/or 808c. For example, server device 802 and/or 804 can provide content to the programmable devices 808a-808c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, the server device 802 and/or 804 can provide the programmable devices 808a-808c with access to software for database, search, computation (e.g., text-to-speech synthesis), graphical, audio (e.g. speech recognition), video, World Wide Web/Internet utilization, and/or other functions. Many other examples of server devices are possible as well. In some examples, the server devices 802 and/or 804 may perform functions described in FIGS. 1-7 to generate a cross-lingual dataset and/or a nativized lexicon.

The server devices 802 and/or 804 can be cloud-based devices that store program logic and/or data of cloud-based applications and/or services. In some examples, the server devices 802 and/or 804 can be a single computing device residing in a single computing center. In other examples, the server device 802 and/or 804 can include multiple computing devices in a single computing center, or multiple computing devices located in multiple computing centers in diverse geographic locations. For example, FIG. 8 depicts each of the server devices 802 and 804 residing in different physical locations.

In some examples, data and services at the server devices 802 and/or 804 can be encoded as computer readable information stored in non-transitory, tangible computer readable media (or computer readable storage media) and accessible by programmable devices 808a, 808b, and 808c, and/or other computing devices. In some examples, data at the server device 802 and/or 804 can be stored on a single disk drive or other tangible storage media, or can be implemented on multiple disk drives or other tangible storage media located at one or more diverse geographic locations.

Figure 9:
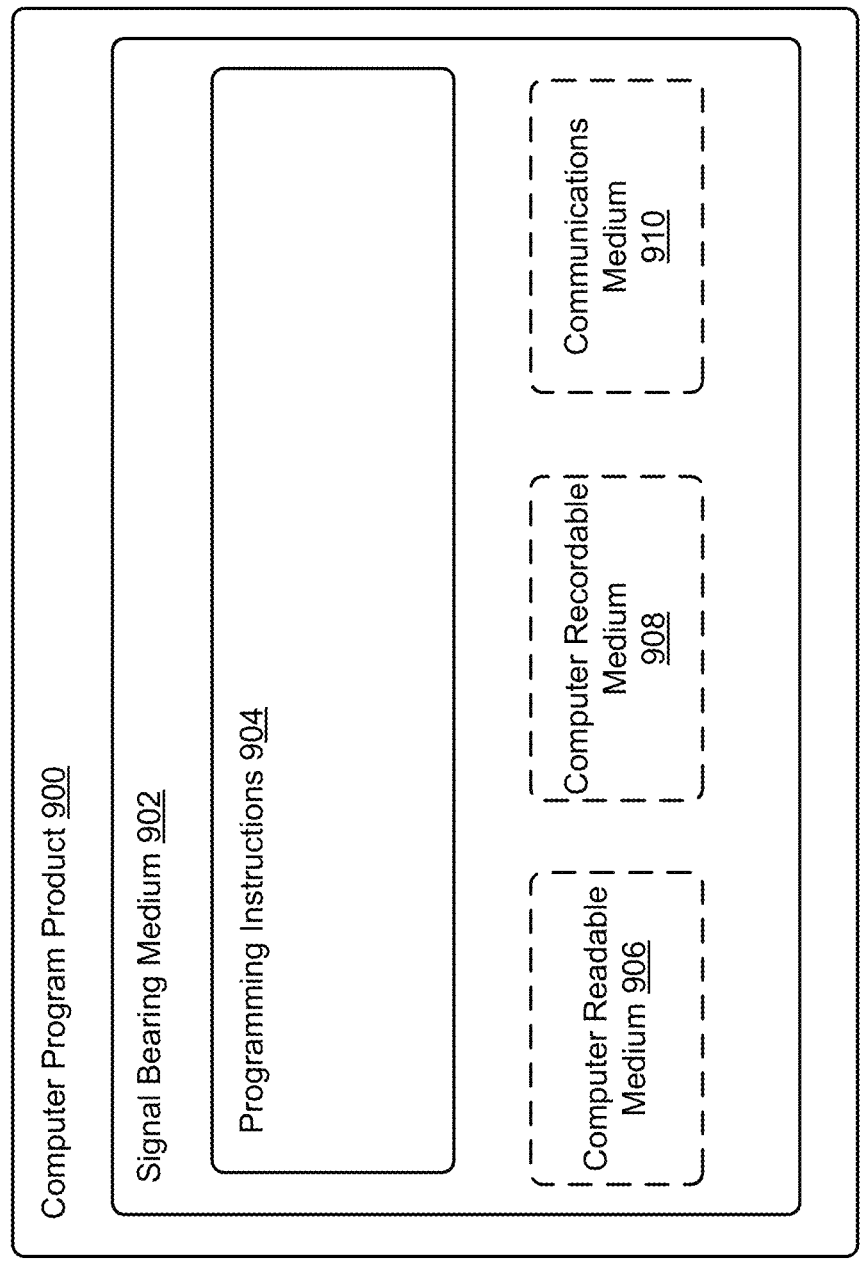
FIG. 9 depicts an example computer-readable medium configured according to at least some embodiments described herein.

FIG. 9 depicts an example computer-readable medium configured according to at least some embodiments described herein. In example embodiments, the example system can include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 200, 400, 500, and 700) can be implemented by computer program instructions encoded on a computer readable storage media in a machine-readable format, or on other media or articles of manufacture (e.g., the instructions stored on the memory 118 of the device 110 of the system 100, or the instructions that operate the server devices 802-804 and/or the programmable devices 808a-808c in FIG. 8). FIG. 9 is a schematic illustrating a conceptual partial view of an example computer program product that includes a computer program for executing a computer process on a computing device, arranged according to at least some embodiments disclosed herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 can be a computer-readable medium 906, such as, but not limited to, a hard disk drive, a Compact Disc (CD), a Digital Video Disk (DVD), a digital tape, memory, etc. In some implementations, the signal bearing medium 902 can be a computer recordable medium 908, such as, but not limited to, memory, read/write (R/W) CDs, R/W DVDs, etc. In some implementations, the signal bearing medium 902 can be a communication medium 910 (e.g., a fiber optic cable, a waveguide, a wired communications link, etc.). Thus, for example, the signal bearing medium 902 can be conveyed by a wireless form of the communications medium 910.

The one or more programming instructions 904 can be, for example, computer executable and/or logic implemented instructions. In some examples, a computing device such as the processor-equipped devices 110 and programmable devices 808a-c of FIGS. 1A and 8 is configured to provide various operations, functions, or actions in response to the programming instructions 904 conveyed to the computing device by one or more of the computer readable medium 906, the computer recordable medium 908, and/or the communications medium 910. In other examples, the computing device can be an external device such as server devices 802-804 of FIG. 8 in communication with a device such as device 110 or programmable devices 808a-808c.

The computer readable medium 906 can also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server. For example, the computer program product 800 can implement the functionalities discussed in the description of FIGS. 1-8.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a computing device that includes one or more processors, an input indicative of linguistic content that includes text or speech in a first-language;
receiving, by the computing device, data indicative of an acoustic feature comparison between a plurality of first-language speech sounds and a plurality of second-language speech sounds; and
providing, based on the data, an output indicative of a pronunciation of the linguistic content in the first-language according to speech sounds of a second-language.

2. The method of claim 1, further comprising:
determining, based on the data, a lexicon that includes a plurality of entries, wherein a given entry in the lexicon includes text in the first-language matched with a phonemic representation that includes one or more phonemes of the second-language, and wherein the phonemic representation is indicative of a pronunciation of the text in the first-language according to the speech sounds of the second-language; and
identifying, from within the lexicon, the given entry having the text that corresponds to the linguistic content indicated in the input, wherein the output is based on the phonemic representation in the identified given entry.

3. The method of claim 2, wherein determining the lexicon comprises receiving the lexicon from an external computing device.

4. The method of claim 2, wherein providing the output comprises the computing device generating an audio signal indicative of one or more speech sounds of the second-language associated with the phonemic representation in the identified given entry.

5. The method of claim 2, wherein providing the output comprises the computing device generating second-language text based on the phonemic representation in the identified given entry.

6. The method of claim 2, further comprising:
determining a first acoustic feature representation of the plurality of first-language speech sounds, and a second acoustic feature representation of the plurality of second-language speech sounds; and
determining a mapping between the first acoustic feature representation and the second acoustic feature representation, wherein the acoustic feature comparison indicated in the received data is based on the mapping, and wherein determining the lexicon is based on the mapping.

7. The method of claim 6, further comprising:
determining association probabilities between the first acoustic feature representation and the second acoustic feature representation, wherein determining the mapping is based on determining the association probabilities.

8. The method of claim 6, further comprising:
receiving a plurality of second-language phonemes having a given association with the plurality of second-language speech sounds; and
based on the mapping and the given association, determining assignments between the plurality of first-language speech sounds and one or more of the second-language phonemes, wherein determining the lexicon is based on the assignments.

9. A method comprising:
receiving, by a computing device that includes one or more processors, an input indicative of a pronunciation of linguistic content in a first-language according to speech sounds of a second-language, wherein the linguistic content includes text or speech;
receiving, by the computing device, data indicative of an acoustic feature comparison between a plurality of first-language speech sounds and a plurality of second-language speech sounds;
determining, based on the data, the linguistic content indicated by the input; and
providing, by the computing device, an output indicative of the determined linguistic content.

10. The method of claim 9, further comprising:
determining, based on the data, a lexicon that includes a plurality of entries, wherein a given entry in the lexicon includes text in the first-language matched with a phonemic representation that includes one or more phonemes of the second-language, and wherein the phonemic representation is indicative of a pronunciation of the text in the first-language according to the speech sounds of the second-language; and
identifying, from within the lexicon, the given entry having the phonemic representation that corresponds to the pronunciation of the linguistic content indicated in the input, wherein determining the linguistic content is based on the text in the identified given entry.

11. The method of claim 10, wherein determining the lexicon comprises receiving the lexicon from an external computing device.

12. The method of claim 10, wherein providing the output comprises the computing device generating an audio signal indicative of one or more speech sounds of the first-language that correspond to a pronunciation of the text in the identified given entry.

13. The method of claim 10, wherein providing the output comprises providing the text in the identified given entry.

14. The method of claim 10, further comprising:
determining a first acoustic feature representation of the plurality of first-language speech sounds, and a second acoustic feature representation of the plurality of second-language speech sounds; and
determining a mapping between the first acoustic feature representation and the second acoustic feature representation, wherein the acoustic feature comparison indicated in the received data is based on the mapping, and wherein determining the lexicon is based on the mapping.

15. The method of claim 14, further comprising:
determining association probabilities between the first acoustic feature representation and the second acoustic feature representation, wherein determining the mapping is based on determining the association probabilities.

16. The method of claim 14, further comprising:
receiving a plurality of second-language phonemes having a given association with the plurality of second-language speech sounds; and
based on the mapping and the given association, determining assignments between the plurality of first-language speech sounds and one or more of the second-language phonemes, wherein determining the lexicon is based on the assignments.

17. A device comprising:
one or more processors; and
data storage configured to store instructions executable by the one or more processors to cause the device to:
receive an input indicative of a pronunciation of linguistic content in a first-language according to speech sounds of a second-language, wherein the linguistic content includes text or speech;
receive data indicative of an acoustic feature comparison between a plurality of first-language speech sounds and a plurality of second-language speech sounds;
determine, based on the data, the linguistic content indicated by the input; and
provide an output indicative of the determined linguistic content.

18. The device of claim 17, wherein the instructions executable by the one or more processors further cause the device to:
determine, based on the data, a lexicon that includes a plurality of entries, wherein a given entry in the lexicon includes text in the first-language matched with a phonemic representation that includes one or more phonemes of the second-language, and wherein the phonemic representation is indicative of a pronunciation of the text in the first-language according to the speech sounds of the second-language; and
identify, from within the lexicon, the given entry having the phonemic representation that corresponds to the pronunciation of the linguistic content indicated in the input, wherein determining the linguistic content is based on the text in the identified given entry.

19. The device of claim 18, wherein determining the lexicon comprises receiving the lexicon from an external computing device.

20. The method of claim 18, wherein providing the output comprises the device generating an audio signal indicative of one or more speech sounds of the first-language that correspond to a pronunciation of the text in the identified given entry.

* * * * *